US012782971B2

(12) United States Patent
Kim et al.

(10) Patent No.: US 12,782,971 B2
(45) Date of Patent: Nov. 3, 2026

(54) AUTOMATIC TRANSPORTATION CONTROL METHOD AND AUTOMATIC TRANSPORTATION SYSTEM USING AUTOMATIC GUIDANCE VEHICLE

(71) Applicant: LG Energy Solution, Ltd., Seoul (KR)

(72) Inventors: Dong Su Kim, Daejeon (KR); Junyeong Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 326 days.

(21) Appl. No.: 18/693,043

(22) PCT Filed: Sep. 23, 2022

(86) PCT No.: PCT/KR2022/014255

§ 371 (c)(1),
(2) Date: Mar. 18, 2024

(87) PCT Pub. No.: WO2023/058970

PCT Pub. Date: Apr. 13, 2023

(65) Prior Publication Data

US 2025/0130592 A1 Apr. 24, 2025

(30) Foreign Application Priority Data

Oct. 7, 2021 (KR) ........................ 10-2021-0133508

(51) Int. Cl.
*G05D 1/667* (2024.01)
*G05D 1/229* (2024.01)
(Continued)

(52) U.S. Cl.
CPC ............. *G05D 1/667* (2024.01); *G05D 1/229* (2024.01); *G05D 1/661* (2024.01); *G05D 2105/28* (2024.01); *G05D 2107/70* (2024.01)

(58) Field of Classification Search
CPC ........ G05D 1/667; G05D 1/229; G05D 1/661; G05D 2105/28; G05D 2107/70;
(Continued)

(56) References Cited

U.S. PATENT DOCUMENTS 10,613,533 B1 * 4/2020 Payson .................... B65G 1/10
11,460,864 B2 * 10/2022 Ito ........................... G05D 1/02
(Continued)

FOREIGN PATENT DOCUMENTS

CN 102725704 A * 10/2012 ........... G05D 1/0278
CN 105883330 A 8/2016
(Continued)

OTHER PUBLICATIONS

Modeling_Distributed_Transportation_Systems_Flexible_Automated_Guided_Vehicles_Herrero-Perez (Year: 2010).*
(Continued)

*Primary Examiner* — Jacob S. Scott
(74) *Attorney, Agent, or Firm* — Lerner David LLP

(57) ABSTRACT

An automatic transportation control method includes moving, by an automatic guidance vehicle, to a first node which is an initial reference location according to an instruction from an automatic transportation control apparatus; moving, by the automatic guidance vehicle, to a second node which is a stand-by location before entering a production facility from the first node; moving, by the automatic guidance vehicle, to a third node for docking to the production facility from the second node; and receiving, by the automatic guidance vehicle, the changed location coordinate value of the second node from the automatic transportation control apparatus, and traveling based on the changed location coordinate value of the second node when the second node is changed according to a work location change of the production facility.

10 Claims, 4 Drawing Sheets

(51) Int. Cl.
*G05D 1/661* (2024.01)
*G05D 105/28* (2024.01)
*G05D 107/70* (2024.01)

(58) Field of Classification Search
CPC .. G05D 2105/45; G05D 2109/10; G05D 1/24; G05D 1/698; G05B 19/41895; Y02P 90/02
See application file for complete search history.

(56) References Cited

U.S. PATENT DOCUMENTS

| | | | | |
|---|---|---|---|---|
| 2012/0236141 | A1 | 9/2012 | Takagawa et al. | |
| 2012/0296495 | A1* | 11/2012 | Ozaki | G05D 1/0278 701/25 |
| 2014/0297017 | A1* | 10/2014 | Mizutani | G05B 19/4189 700/112 |
| 2017/0008728 | A1* | 1/2017 | Takagawa | B65H 75/446 |
| 2017/0043953 | A1 | 2/2017 | Battles et al. | |
| 2019/0227571 | A1* | 7/2019 | Ito | G05D 1/0282 |
| 2020/0319648 | A1* | 10/2020 | Eckman | B65G 1/1375 |
| 2021/0080968 | A1* | 3/2021 | Burkhart | G05D 1/0282 |

FOREIGN PATENT DOCUMENTS

| | | | | | |
|---|---|---|---|---|---|
| CN | 112330119 | A | | 2/2021 | |
| CN | 114330906 | A | * | 4/2022 | |
| CN | 114355852 | A | * | 4/2022 | |
| CN | 114440908 | B | * | 7/2023 | G01C 21/3415 |
| EP | 4167207 | A1 | * | 4/2023 | G08G 1/096844 |
| JP | H04069135 | A | | 3/1992 | |
| JP | H07028471 | A | | 1/1995 | |
| JP | 2893695 | B2 | | 5/1999 | |
| JP | H11301896 | | * | 11/1999 | |
| JP | H11301896 | A | | 11/1999 | |
| JP | 2000042873 | A | | 2/2000 | |
| JP | 3187351 | B2 | | 7/2001 | |
| JP | 3212029 | B2 | * | 9/2001 | |
| JP | 3364021 | B2 | * | 1/2003 | |
| JP | 2004240474 | A | | 8/2004 | |
| JP | 3714254 | B2 | | 11/2005 | |
| JP | 4093245 | B2 | | 6/2008 | |
| JP | 4441914 | B2 | | 3/2010 | |
| JP | 2011181796 | A | | 9/2011 | |
| JP | 5150003 | B1 | | 2/2013 | |
| JP | 2013125788 | A | * | 6/2013 | G05B 19/4189 |
| JP | 2018039293 | A | | 3/2018 | |
| JP | 2019125246 | A | * | 7/2019 | G05D 1/2446 |
| KR | 200431867 | Y1 | | 11/2006 | |
| KR | 20120090402 | A | | 8/2012 | |
| KR | 101327880 | B1 | | 11/2013 | |
| KR | 101525311 | B1 | | 6/2015 | |
| KR | 102171473 | B1 | | 10/2020 | |
| KR | 20200130751 | A | | 11/2020 | |
| KR | 102331181 | B1 | | 12/2021 | |
| WO | 2015151359 | A1 | | 10/2015 | |
| WO | WO-2018003814 | A1 | * | 1/2018 | B60W 30/06 |
| WO | WO-2018021457 | A1 | * | 2/2018 | G08G 1/20 |

OTHER PUBLICATIONS

CN 114440908 B—Translation (Year: 2023).*
EP 4167207 A1—Translation (Year: 2023).*
WO 2018003814 A1—Translation (Year: 2018).*
WO 2018021457 A1—Translation (Year: 2018).*
International Search Report for PCT/KR2022/014255 mailed Dec. 13, 2022. 3 pages.
Perez, D. H. "Modeling Distributed Transportation Systems Composed of Flexible Automated Guided Vehicles in Flexible Manufacturing Systems" IEEE Transactions on Industrial Informatics, May 2010, pp. 166-180, vol. 6. No. 2.
Extended European Search Report including Written Opinion for Application No. 22878791.7 dated Sep. 16, 2024, pp. 1-8.

* cited by examiner

[Figure 1]
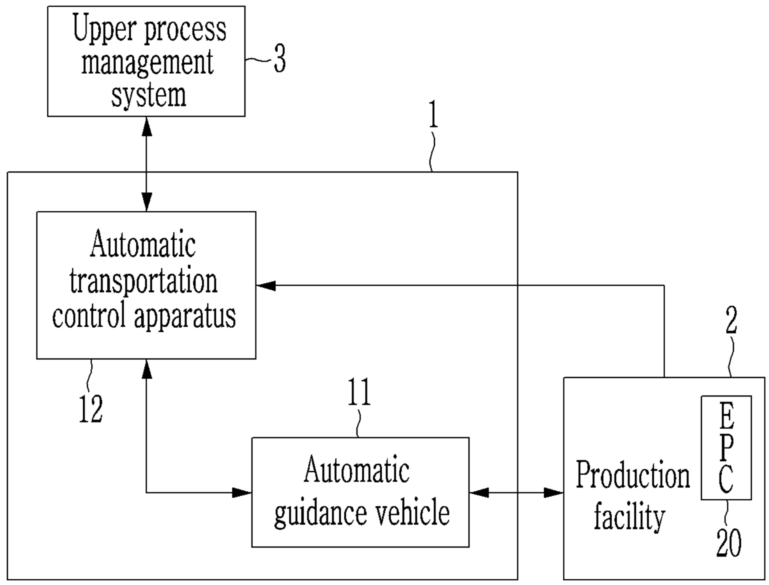

[Figure 2]
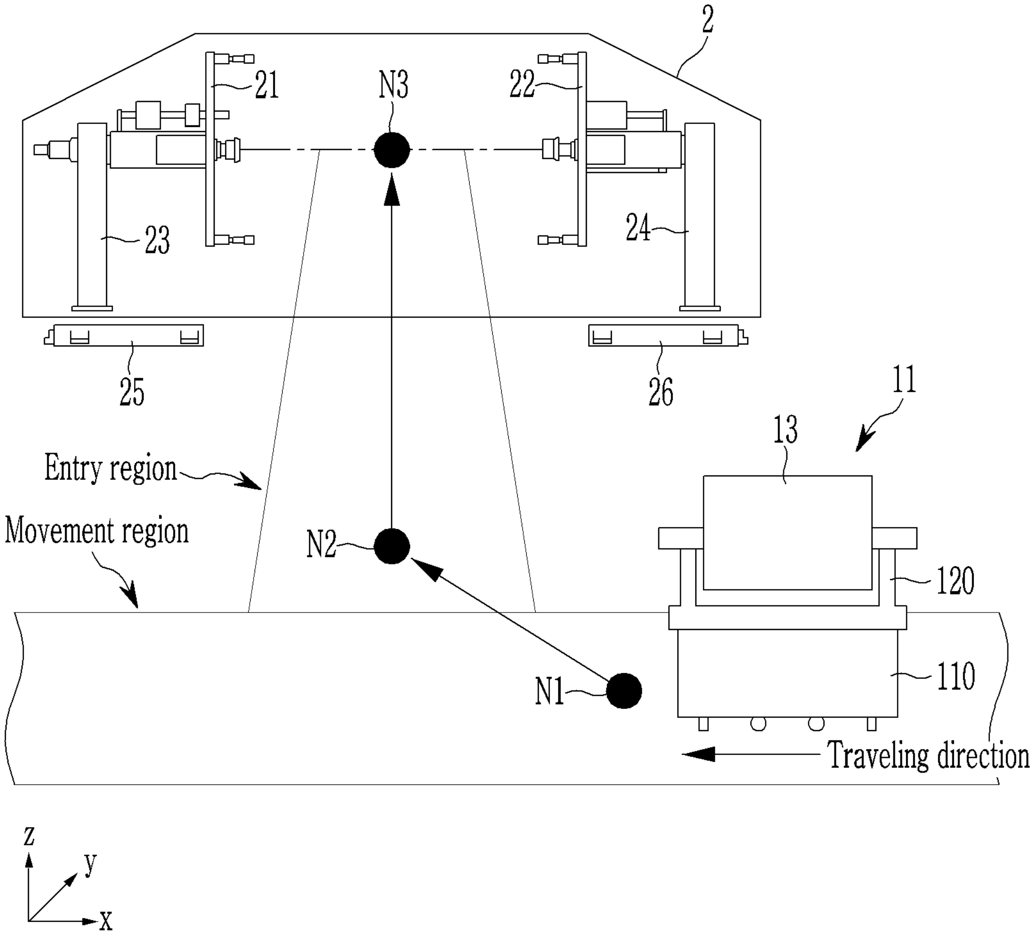

【Figure 3a】
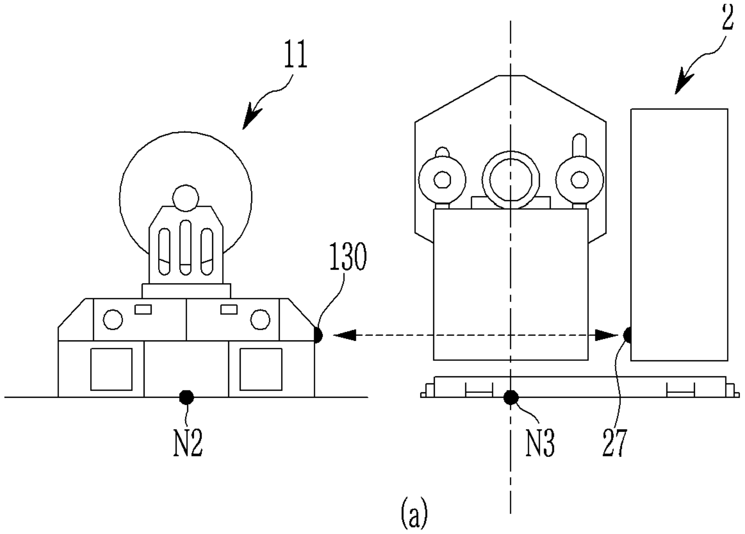
(a)
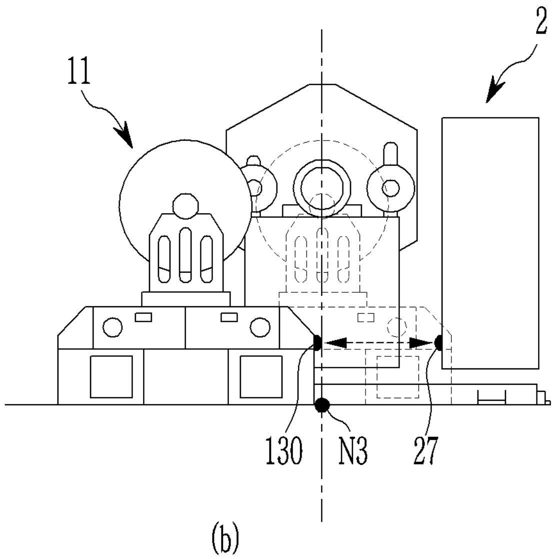
(b)
【Figure 3b】

【Figure 4】
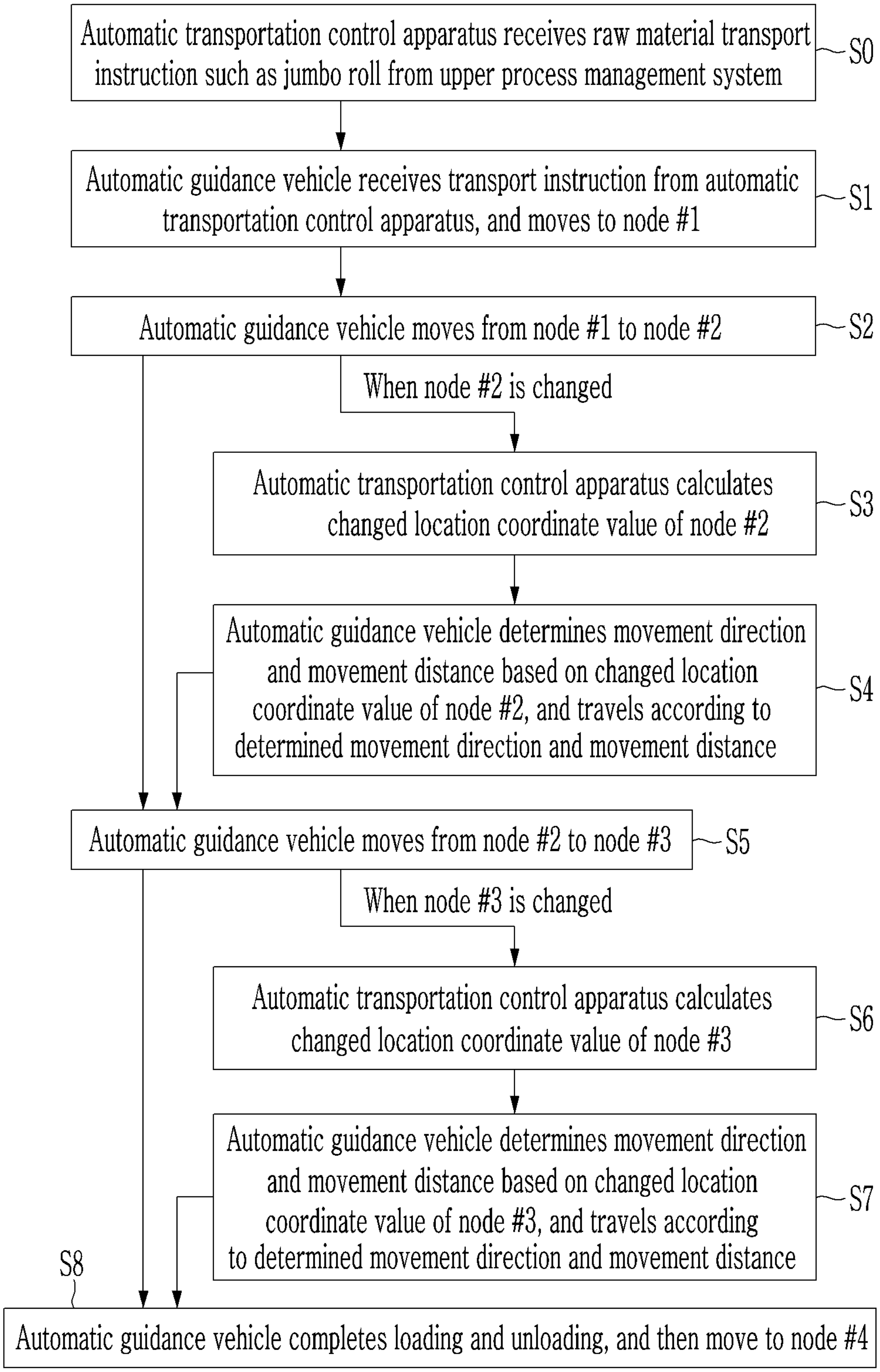

AUTOMATIC TRANSPORTATION CONTROL METHOD AND AUTOMATIC TRANSPORTATION SYSTEM USING AUTOMATIC GUIDANCE VEHICLE

CROSS-REFERENCE TO RELATED APPLICATION(S)

This application is a national phase entry under 35 U.S.C. § 371 of International Application No. PCT/KR2022/014255, filed on Sep. 23, 2022, which claims priority to and the benefit of Korean Patent Application No. 10-2021-0133508 filed in the Korean Intellectual Property Office on Oct. 7, 2021, the entire contents of which are incorporated herein by reference.

TECHNICAL FIELD

The present disclosure relates to an automatic transportation control method and an automatic transportation system using an automatic guidance vehicle.

BACKGROUND

In the related art, production workers manually carry raw materials such as jumbo rolls to load and unload jumbo rolls on electrode facilities. However, due to such a manual work, work efficiency of the production worker is added. Further, the jumbo rolls drop while the jumbo rolls are transported and the jumbo rolls are loaded on and unloaded from the electrode facilities, so a safety accident may occur.

Further, when the production facility is the electrode facility, snaking of the jumbo rolls is corrected upon a winding operation of the electrode on an edge positioning controller (EPC) for securing a processing quality. It is difficult to automatically dock a vehicle that transports the jumbo rolls to the production facility by the EPC snaking correction.

SUMMARY

Technical Problem

In order to solve the problem in the related art, the present disclosure has been made in an effort to provide an automatic transportation control method and an automatic transportation system using an automatic guidance vehicle, which are capable of automating transportation, loading, and unloading of raw materials such as jumbo rolls.

Technical Solution

An automatic transportation control method according to one feature of the present invention includes: moving, by an automatic guidance vehicle, to a first node which is an initial reference location according to an instruction from an automatic transportation control apparatus; moving, by the automatic guidance vehicle, from the first node to a second node which is a stand-by location before entering a production facility; moving, by the automatic guidance vehicle, from the second node to a third node for docking to the production facility; and receiving, by the automatic guidance vehicle, a changed location coordinate value of the second node from the automatic transportation control apparatus, and in response to receiving the changed location coordinate value of the second node, traveling, by the automatic guidance vehicle, according to a work location change of a component of the production facility.

The automatic transportation control method may further include receiving, by the automatic guidance vehicle, a changed location coordinate value of the third node from the automatic transportation control apparatus, and in response to receiving the changed location coordinate value of the third node, traveling, by the automatic guidance vehicle, according to the work location change of the component of the production facility.

The automatic transportation control method may further include receiving, by the automatic transportation control apparatus, a work location change degree of the component of the production facility from the production facility, and calculating the changed location coordinate value of the third node by reflecting the work location change amount to the location coordinate value of the third node.

The automatic transportation control method may further include receiving, by the automatic transportation control apparatus, the work location change degree of the component of the production facility from the production facility, and calculating the changed location coordinate value of the second node by reflecting the work location change amount to the location coordinate value of the second node.

The automatic transportation control method may further include transmitting/receiving, by the automatic guidance vehicle and the production facility, information for loading or unloading a raw material through parallel input/output (PIO) communication while the automatic guidance vehicle moves from the second node to the third node.

An automatic transportation system of loading a raw material on a production facility or unloading the raw material from the production facility may include: an automatic guidance vehicle configured to move to a first node which is an initial reference location, then from the first node to a second node which is a stand-by location before entering the production facility, and then from the second node to a third node for docking to the production facility; and an automatic transportation control apparatus configured to receive from the production facility information on a work location change of a component of the production facility, change a location coordinate value of the second node according to the information on the work location change, and transmit the changed location coordinate value to the automatic guidance vehicle.

The automatic transportation control apparatus may be configured to receive from the production facility information on a work location change of the component of the production facility, change a location coordinate value of the third node according to the information on the work location change, and transmit the changed location coordinate value to the automatic guidance vehicle.

The automatic transportation control apparatus may be configured to calculate the changed location coordinate value of the third node by reflecting a change amount of the work location in the location coordinate value of the third node.

The automatic transportation control apparatus may be configured to calculate the changed location coordinate value of the second node by reflecting the change amount of the work location in a set location coordinate value of the second node.

The automatic guidance vehicle may include a PIO sensor of the production facility, and a PIO sensor configured to transmit/receive information for loading or unloading the raw material by performing PIO communication while moving from the second node to the third node.

Advantageous Effects

The present disclosure provides an automatic transportation control method and an automatic transportation system using an automatic guidance vehicle, which are capable of automating transportation, loading, and unloading of raw materials such as jumbo rolls.

BRIEF DESCRIPTION OF THE DRAWINGS

FIG. 1 is a diagram schematically illustrating a production factory to which an automatic transportation system is applied according to an embodiment.

FIG. 2 is a layout diagram for describing movement of an automatic guidance vehicle according to an embodiment.

FIG. 3 is a diagram illustrating before and after docking the automatic guidance vehicle to a production facility.

FIG. 4 is a flowchart illustrating an operation of an automatic transportation system according to an embodiment.

DETAILED DESCRIPTION

Hereinafter, embodiments disclosed in this specification will be described in detail with reference to the accompanying drawings and the same or similar components are denoted by the same or similar reference numerals, and duplicated description thereof will be omitted. Suffixes "module" and/or "unit" for components used in the following description are given or mixed in consideration of easy preparation of the present disclosure only and do not have their own distinguished meanings or roles. Further, in describing an embodiment disclosed in the present invention, a detailed description of related known technologies will be omitted if it is determined that the detailed description makes the gist of the embodiment of the present invention unclear. Further, it is to be understood that the accompanying drawings are just used for easily understanding the embodiments disclosed in this specification and a technical spirit disclosed in this specification is not limited by the accompanying drawings and all changes, equivalents, or substitutes included in the spirit and the technical scope of the present invention are included.

Terms including an ordinary number, such as first and second, are used for describing various elements, but the elements are not limited by the terms. The terms are used only to discriminate one element from another element.

It should be understood that, when it is described that a component is "connected to" or "accesses" another component, the component may be directly connected to or access the other component or a third component may be present therebetween. In contrast, when it is described that a component is "directly connected to" or "directly accesses" another component, it is understood that no element is present between the element and another element.

In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

FIG. 1 is a diagram schematically illustrating a production factory to which an automatic transportation system is applied according to an embodiment.

As illustrated in FIG. 1, the automatic transportation system 1 includes an automatic guidance vehicle 11 and an automatic transportation control apparatus 12. The automatic transportation control apparatus 12 may control the automatic guidance vehicle 11 based on information received from an upper process management system 3, a production facility 2, etc., through wired/wireless communication. For example, the automatic transportation control apparatus 12 may adjust a location coordinate value indicating a location of a work node (e.g., node #2 N2 and node #3 N3) based on information on locations of turrets 21 and 22 received from the production facility 2, and transmit the location coordinate value to the automatic guidance vehicle 11 through the wireless communication. The automatic guidance vehicle 11 may travel according to the received work node.

FIG. 2 is a layout diagram for describing movement of an automatic guidance vehicle according to an embodiment.

FIG. 3 is a diagram illustrating before and after docking the automatic guidance vehicle to a production facility.

In FIG. 2, the production facility 2 includes an EPC 20, two turrets 21 and 22, location driving units 23 and 24 adjusting locations of the turrets, lower fixation units 25 and 26, and a parallel input/output (PIO) sensor 27 facing each other. This is an example for describing an embodiment, and the production facility to which the present invention is applied is not limited to contents illustrated in FIGS. 2 and 3. In the following description, the location of the automatic guidance vehicle 11 may be determined based on a center in an entire structure of the automatic guidance vehicle 11.

The location driving units 23 and 24 are devices that are connected to the turrets 21 and 22 to move the locations of the turrets 21 and 22 horizontally (an x-axis direction in FIG. 2). An EPC 20 (see FIG. 1) is a device that corrects snaking of an electrode member in order to match edge locations of electrode members upon a winding or unwinding operation of the electrode member. The EPC 20 may correct snaking by controlling the operations of the location driving units 23 and 24. The locations of the turrets 21 and 22 may horizontally move in the x-axis direction by snaking correction.

The automatic guidance vehicle 11 includes a driving device 110, a transfer device 120, and a PIO sensor 130. The transfer device 120 as a device installed on the driving device 110 and loading and transporting a raw material (e.g., a jumbo roll) is movable in all x-axis, y-axis, and z-axis directions. The driving device 110 may move the automatic guidance vehicle 11 in the x-axis and y-axis directions according to control by the automatic transportation control apparatus 12. x-axis and y-axis direction movement ranges of the transfer device 120 are limited, so the driving device 110 may move for adjusting the location of the transfer device 120. An electrode member having a predetermined width and a predetermined length is wound on the jumbo roll.

The automatic guidance vehicle 11 moves by the driving device 110, and the automatic guidance vehicle 11 is docked to the production facility 2 and the transfer device 120 may move to load and unload the jumbo roll 13. Through communication according to a communication rule applied when moving logistics between equipments, the PIO sensor 27 and the PIO sensor 130 may transmit/receive information for loading and unloading of a jumbo roll 13 between the automatic guidance vehicle 11 and the production facility 2 to/from each other by parallel input output (PIO) communication. For example, while the automatic guidance vehicle 11 moves from node #2 N2 to node #3 N3, the production facility 2 and the automatic guidance vehicle 11 transmit/receive information through the PIO communication using the PIO sensors 27 and 130.

As illustrated in FIG. 2, first, the automatic guidance vehicle 11 according to an embodiment moves and reaches node #1 N1. Node #1 N1 means an initial reference location X1, Y1 of the automatic guidance vehicle 11 for the production facility 2. A region (hereinafter, referred to as an entire movement region) in which the automatic guidance vehicle 11 may move in a production factory in which a production line is installed may be distinguished as coordinates. For example, the entire movement region may be distinguished as a plurality of nodes defined by an x coordinate value of a predetermined unit (e.g., mm) set in the x-axis direction and a y coordinate value of a predetermined unit (e.g., mm) set in the y-axis direction. The entire movement region may include a movement region of the automatic guidance vehicle positioned in the x-axis direction and an entry region into the production facility positioned in the y-axis direction to dock the automatic guidance vehicle to the production facility in FIG. 2.

In the entire movement region, node #1 N1 which is the initial reference location X1, Y1 is set as an initial point to be positioned at which the automatic guidance vehicle is docked to the production facility 2

Node #1 N1 may be positioned in the movement region of the automatic guidance vehicle. The automatic guidance vehicle 11 may move up to node #1 N1 from an arbitrary start location in the entire movement region.

Subsequently to node #1 N1, the automatic guidance vehicle 11 moves to node #2 N2 which is a location in which the automatic guidance vehicle 11 stands by before entering the production facility 2. PIO communication between the production facility 2 and the automatic guidance vehicle 11 from node #2 N2 may be enabled.

x-axis and y-axis coordinate values X2, Y2 of node #2 N2 may be initially set. When the automatic guidance vehicle 11 starts to move from node #1 N1 to node #2 N2, the automatic guidance vehicle 11 may set a movement direction and a movement distance according to a location coordinate value of node #2 N2 set from the automatic transportation control apparatus 12. The automatic guidance vehicle 11 travels as long as the movement distance in the set movement direction.

The location of node #2 N2 may be varied according to variation of a work location of the production facility 2. For example, while the locations of turrets 21 and 22 move by the control by the EPC 20, the location of node #2 N2 may also be changed. In particular, when the turrets 21 and 22 move in the x-axis direction, node #2 N2 should move jointly as much as the corresponding movement amount ΔX2. The EPC 20 may transmit movement information of the turrets 21 and 22 to the automatic transportation control apparatus 12, and the automatic transportation control apparatus 12 may calculate the location coordinate value of node #2 N2 changed based on a change amount of node #2 N2 based on the movement information of the turrets 21 and 22. The automatic transportation control apparatus 12 may transmit a location coordinate value (X2+ΔX2, Y2) of node #2 N2 changed to the automatic guidance vehicle 11. When node #2 N2 moves to the right, ΔX2 may have a positive value and when node #2 N2 moves to the left, ΔX2 may have a negative value.

When the automatic guidance vehicle 11 starts to move from node #1 N1 to node #2 N2, the automatic guidance vehicle 11 may set the movement direction and the movement distance according to the changed location coordinate value of node #2 N2 received from the automatic transportation control apparatus 12. The automatic guidance vehicle 11 travels as long as the movement distance in the set movement direction.

The automatic guidance vehicle 11 may receive the location coordinate value of node #2 N2 from the automatic transportation control apparatus 12 in real time while moving from node #1 N1 to node #2 N2, and correct a current movement direction and a current movement distance based on the received location coordinate value of node #2 N2. For example, while the automatic guidance vehicle 11 moves from node #1 N1 to node #2 N2, the automatic guidance vehicle 11 adjusts the movement direction by calculating a distance difference for each of the x-axis direction and the y-axis direction up to the location coordinate value (X2+ΔX2, Y2) of node #2 N2 from a current location (X, Y), and move as long as a movement distance up to node #2 N2 changed from the current location.

Subsequently to node #2 N2, the automatic guidance vehicle 11 moves to node #3 N3 to be docked to the production facility 2. That is, node #3 N3 means a location at which the automatic guidance vehicle 11 is docked to the production facility 2 to load or unload the jumbo roll 13. The automatic guidance vehicle 11 that moves from node #2 N2 to node #3 N3 transmits/receives information required for loading or unloading the jumbo roll 13 through PIO communication using the production facility 2 and each PIO sensor. The automatic guidance vehicle 11 moves from node #2 N2 to node #3 N3 while holding the jumbo roll 13, and as a result, the jumbo roll 13 held on the automatic guidance vehicle 11 may be chucked (loaded) on the turrets 21 and 22. The automatic guidance vehicle 11 moves from node #2 N2 to node #3 N3 to hold the jumbo roll 13 un-chucked (unloaded) from the turrets 21 and 22.

First, the automatic guidance vehicle 11 and the production facility 2 may at least transmit/receive the following information for loading through the PIO communication.

The automatic guidance vehicle 11 announces that the automatic guidance vehicle 11 is positioned in node #2 N2 to the production facility 2. The production facility 2 announces that the jumbo roll 13 may be loaded to the automatic guidance vehicle 11. The automatic guidance vehicle 11 announces moving from node #2 N2 to node #3 N3. The production facility 2 announces that the jumbo roll 13 may be loaded to the automatic guidance vehicle 11. The automatic guidance vehicle 11 is docked to node #3 N3 and requests a chucking operation to the production facility 2. The production facility 2 announces that chucking is being performed to the automatic guidance vehicle 11 in response to the request, and when chucking is completed, the production facility 2 may announce chucking completion to the automatic guidance vehicle 11.

The automatic guidance vehicle 11 and the production facility 2 may at least transmit/receive the following information for unloading through the PIO communication.

The automatic guidance vehicle 11 announces that the automatic guidance vehicle 11 is positioned in node #2 N2 to the production facility 2. The production facility 2 requests unloading of the jumbo roll 13 to the automatic guidance vehicle 11. The automatic guidance vehicle 11 announces moving from node #2 N2 to node #3 N3. The production facility 2 announces that the jumbo roll 13 may be unloaded. The automatic guidance vehicle 11 is docked to node #3 N3 and requests a un-chucking operation to the production facility 2. The production facility 2 announces that un-chucking is being performed to the automatic guidance vehicle 11 in response to the request, and when un-chucking is completed, the production facility 2 may announce un-chucking completion to the automatic guidance vehicle 11.

As illustrated in FIG. 3(*a*), the automatic guidance vehicle 11 reaches node #2 N2 in the y-axis direction. As illustrated in FIG. 3(*b*), the automatic guidance vehicle 11 enters node #3 N3 from node #2 N2 and a center of the automatic guidance vehicle 11 reaches node #3 N3. Then, the automatic guidance vehicle 11 is docked to the production facility 2. After docking, in order to chuck the jumbo roll 13 on the turrets 21 and 22 or in order un-chuck the jumbo roll 13 from the turrets 21 and 22, the transfer device 120 may move in the z-axis direction.

When the automatic guidance vehicle 11 starts to move from node #2 N2 to node #3 N3, the automatic guidance vehicle 11 may set the movement direction and the movement distance according to the current location coordinate value of node #3 N3

The automatic guidance vehicle 11 travels as long as the movement distance in the set movement direction.

During a period in which the automatic guidance vehicle 11 moves from node #2 N2 to node #3 N3, the location of node #3 N3 may be varied according to the variation of the work location of the production facility 2. For example, while the locations of turrets 21 and 22 move by the control by the EPC 20, the location of node #3 N3 may also be changed. In particular, when the turrets 21 and 22 move in the x-axis direction, node #3 N3 should move jointly as much as the corresponding movement amount ΔX3. The EPC 20 may transmit movement information of the turrets 21 and 22 to the automatic transportation control apparatus 12, and the automatic transportation control apparatus 12 may change the location coordinate value of node #3 N3 based on the movement information of the turrets 21 and 22, and transmit a changed location coordinate value (X3+AX3, Y3) of node #3 N3 to the automatic guidance vehicle 11. When node #3 N3 moves to the right, ΔX3 may have the positive value and when node #3 N3 moves to the left, ΔX3 may have the negative value.

The automatic guidance vehicle 11 may correct the current movement direction and the current movement distance based on the changed location coordinate value of node #3 N3. For example, while the automatic guidance vehicle 11 moves from node #2 N2 to node #3 N3, the automatic guidance vehicle 11 adjusts the movement direction by calculating the distance difference for each of the x-axis direction and the y-axis direction up to node #3 N3 from the current location (X, Y), and move as long as the movement distance up to node #3 N3 changed from the current location.

The automatic guidance vehicle 11 may complete loading and unloading of the jumbo roll 13 by reaching node #3 N3, and then the automatic guidance vehicle 11 may move from node #3 N3 to node #4. After the automatic guidance vehicle 11 reaches node #3 N3, the transfer device 120 may move to a location for loading and unloading of the jumbo roll 13.

FIG. 4 is a flowchart illustrating an operation of an automatic transportation system according to an embodiment.

First, the automatic transportation control apparatus 12 may receive a raw material transport instruction such as the jumbo roll 13 from the upper process management system 3 (S0). The transport instruction may include information on a location of a warehouse storing the raw material, a location of the production facility, a work time, etc.

The automatic guidance vehicle 11 may receive the transport instruction from the automatic transportation control apparatus 12, and move to node #1 N1 (S1). In the case of loading of the raw material, the automatic guidance vehicle 11 may move to the warehouse storing the raw material and hold the raw material, and then move to node #1 N1. In the case of unloading of the raw material, the automatic guidance vehicle 11 may move to node #1 N1 from the current location.

Subsequently, the automatic guidance vehicle 11 may move from node #1 N1 to node #2 N2 (S2).

In this case, when node #2 N2 is changed according to a change in work location of the production facility 2 such as location changes of the turrets 21 and 22, the automatic transportation control apparatus 12 may receive a work location change degree of the production facility 2 from the EPC 20, and calculate the changed location coordinate value of node #2 N2 by reflecting a work location change amount to a predetermined location coordinate value of node #2 N2 (S3).

The automatic guidance vehicle 11 may receive the changed location coordinate value of node #2 N2 from the automatic transportation control apparatus 12, determine the movement direction and the movement distance based on the changed location coordinate value of node #2 N2, and travel according to the determined movement direction and movement distance (S4).

Next, the automatic guidance vehicle 11 may move from node #2 N2 to node #3 N3 (S5). During step S5, the automatic guidance vehicle 11 may transmit/receive information for loading and unloading to/from the production facility 2 through the PIO communication.

In this case, when node #3 N3 is changed according to a change in work location of the production facility 2 such as location changes of the turrets 21 and 22, the automatic transportation control apparatus 12 may receive a work location change degree of the production facility 2 from the EPC 20, and calculate the changed location coordinate value of node #3 N3 by reflecting a work location change amount to the current location coordinate value of node #3 N3 (S6).

The automatic guidance vehicle 11 may receive the changed location coordinate value of node #3 N3 from the automatic transportation control apparatus 12, determine the movement direction and the movement distance based on the changed location coordinate value of node #3 N3, and travel according to the determined movement direction and movement distance (S7).

The automatic guidance vehicle 11 may be docked to the production facility 2, and then complete loading and unloading. The automatic guidance vehicle 11 completes loading and unloading, and then moves to node #4 (S8).

In the related art, in developing an interface with the production facility consecutively performing the work, there is a difficulty due to a poor quality and a risk of production facility down. In order to the automatic guidance vehicle according to an embodiment of the present invention to be automatically docked to the production facility, the automatic transportation control method and the automatic transportation system according to an embodiment may be applied. That is, the interface between the production facility and the automatic transportation system may be implemented through an embodiment of the present invention.

For example, even though the turret moves horizontally in real time through snaking correction for securing the quality of the winding product (e.g., jumbo roll), the present invention provides the interface between the production facility and the automatic guidance vehicle by transmitting the work node to the automatic guidance vehicle according the movement of the turret. As a result, the automatic guidance vehicle may be automatically docked to the production facility.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. An automatic transportation control method comprising:

moving, by an automatic guidance vehicle, to a first node which is an initial reference location according to an instruction from an automatic transportation control apparatus;

moving, by the automatic guidance vehicle, from the first node toward a second node which is a stand-by location before entering a production facility;

receiving, by the automatic guidance vehicle, a changed location coordinate value of the second node from the automatic transportation control apparatus, wherein the changed location coordinate value of the second node indicates a changed location of the second node, and wherein the changed location of the second node corresponds to a movement of a third node which is a docking location at which the automatic guidance vehicle docks to the production facility; and in response to receiving the changed location coordinate value of the second node while the automatic guidance vehicle is in motion from the first node to the second node, adjusting, by the automatic guidance vehicle, a movement direction of the automatic guidance vehicle;

traveling, by the automatic guidance vehicle, toward the changed location of the second node according to the adjusted movement direction;

after reaching the second node, moving, by the automatic guidance vehicle, from the second node to the third node.

2. The automatic transportation control method of claim 1, further comprising:

while moving from the second node to the third node, receiving, by the automatic guidance vehicle, a changed location coordinate value of the third node from the automatic transportation control apparatus, wherein the changed location coordinate value of the third node indicates a changed location of the third node; and in response to receiving the changed location coordinate value of the third node, adjusting, by the automatic guidance vehicle, the movement direction of the automatic guidance vehicle; and traveling, by the automatic guidance vehicle, toward the changed location of the third node according to the adjusted movement direction.

3. The automatic transportation control method of claim 2, further comprising:

receiving from the production facility, by the automatic transportation control apparatus, a work location change degree of the docking location; and calculating the changed location coordinate value of the third node by reflecting a work location change amount to the location coordinate value of the third node.

4. The automatic transportation control method of claim 1, further comprising:

receiving from the production facility, by the automatic transportation control apparatus, a work location change degree of the docking location; and calculating the changed location coordinate value of the second node by reflecting a work location change amount to the location coordinate value of the second node.

5. The automatic transportation control method of claim 1, further comprising:

transmitting/receiving, by the automatic guidance vehicle and the production facility, information for loading or unloading a raw material through parallel input/output (PIO) communication while the automatic guidance vehicle moves from the second node to the third node.

6. An automatic transportation system of loading a raw material on a production facility or unloading the raw material from the production facility, comprising:

an automatic guidance vehicle configured to move to a first node which is an initial reference location, then from the first node to a second node which is a stand-by location before entering the production facility, and then from the second node to a third node for docking to the production facility; and an automatic transportation control apparatus configured to:

receive, from the production facility, information on a work location change indicating a movement of the third node which is a docking location at which the automatic guidance vehicle docks to the production facility;

change a location coordinate value of the second node according to the information on the work location change, and transmit the changed location coordinate value to the automatic guidance vehicle, wherein the automatic guidance vehicle is configured to, in response to receiving the changed location coordinate value of the second node while the automatic guidance vehicle is in motion from the first node to the second node:

adjust a movement direction of the automatic guidance vehicle; and travel toward the changed location of the second node according to the adjusted movement direction.

7. The automatic transportation system of claim 6, wherein:

the automatic transportation control apparatus is configured to, while the automatic guidance vehicle is moving from the second node to the third node, receive, from the production facility, second information on the work location change, change a location coordinate value of the third node according to the second information on the work location change, and transmit the changed location coordinate value of the third node to the automatic guidance vehicle.

8. The automatic transportation system of claim 7, wherein:

the automatic transportation control apparatus is configured to, calculate the changed location coordinate value of the third node by reflecting a change amount of the work location in the location coordinate value of the third node.

9. The automatic transportation system of claim 6, wherein:

the automatic transportation control apparatus is configured to, calculate the changed location coordinate value of the second node by reflecting a change amount of the work location in a set location coordinate value of the second node.

10. The automatic transportation system of claim 6, further comprising:

a first parallel input/output (PIO) sensor of the production facility; and a second PIO sensor included in the automatic guidance vehicle and configured to transmit/receive information for loading or unloading the raw material by performing PIO communication while the automatic guidance vehicle is moving from the second node to the third node.

* * * * *